United States Patent [19]

Amiot

[11] 4,362,277
[45] Dec. 7, 1982

[54] DOMESTIC ELECTRICAL FOOD PROCESSING APPLIANCE

[75] Inventor: Jacques H. J. Amiot, Alencon, France

[73] Assignee: Moulinex, Societe Anonyme, Bagnolet, France

[21] Appl. No.: 185,406

[22] Filed: Sep. 9, 1980

[30] Foreign Application Priority Data

Sep. 21, 1979 [FR] France ................................ 79 23558

[51] Int. Cl.³ .............................................. B02C 18/00
[52] U.S. Cl. ................................ 241/37.5; 241/282.2
[58] Field of Search ....................... 241/37.5, 92, 282.1, 241/282.2, 36, 199.12

[56] References Cited

U.S. PATENT DOCUMENTS 3,892,365  7/1975  Verdum ............................ 241/37.5
4,213,569  7/1980  Amiot ............................... 241/37.5

Primary Examiner—Mark Rosenbaum
Assistant Examiner—Timothy V. Eley
Attorney, Agent, or Firm—Young & Thompson

[57] ABSTRACT

A domestic electrical food processing appliance has a work bowl supported on a base and a detachable cover fixed on said bowl by a bayonet device. An electrical motor is mounted in the base and drives an output shaft which extends within the bowl and carries a cutting tool. The motor is actuated by depressing a push-button slidably mounted in a boss of the base. A safety bolt is pivotably mounted in the boss and urged into a locking position preventing depression of the push-button. The cover carries an arm which, when the cover is moved to its closed position, pivots the safety bolt out of its locking position to allow depression of the push-button. The engagement of the arm with the safety bolt also prevents removal of the cover from the bowl while the push-button is depressed.

8 Claims, 8 Drawing Figures

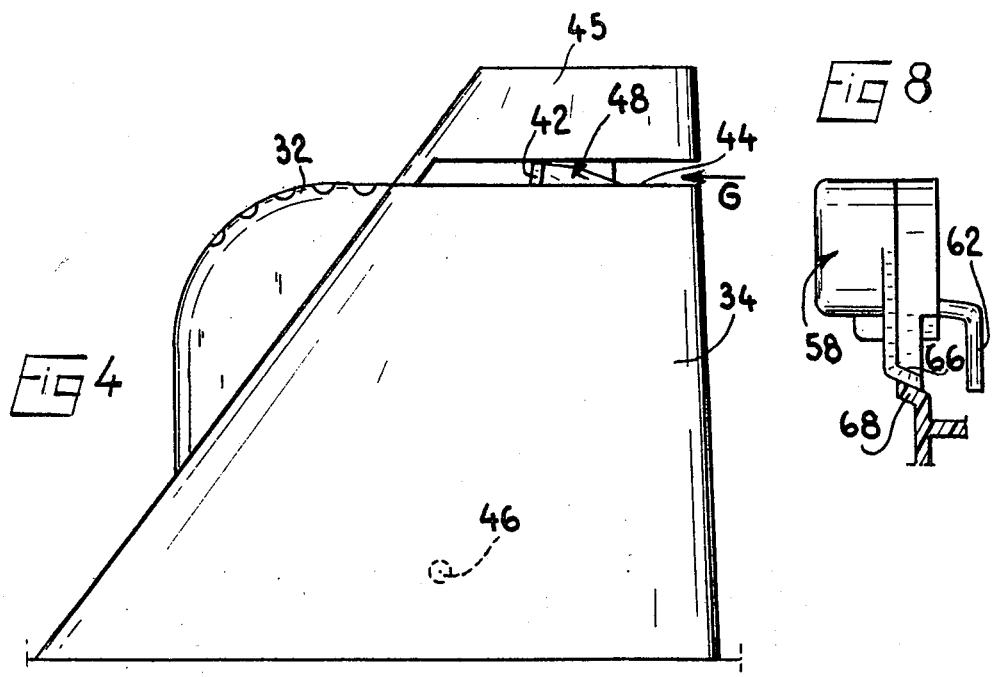
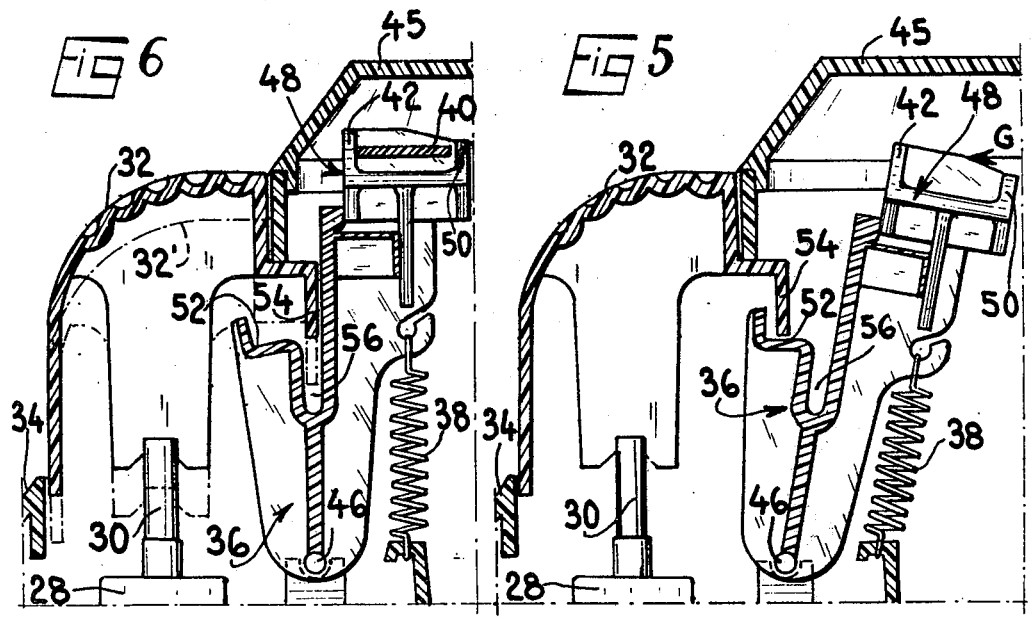

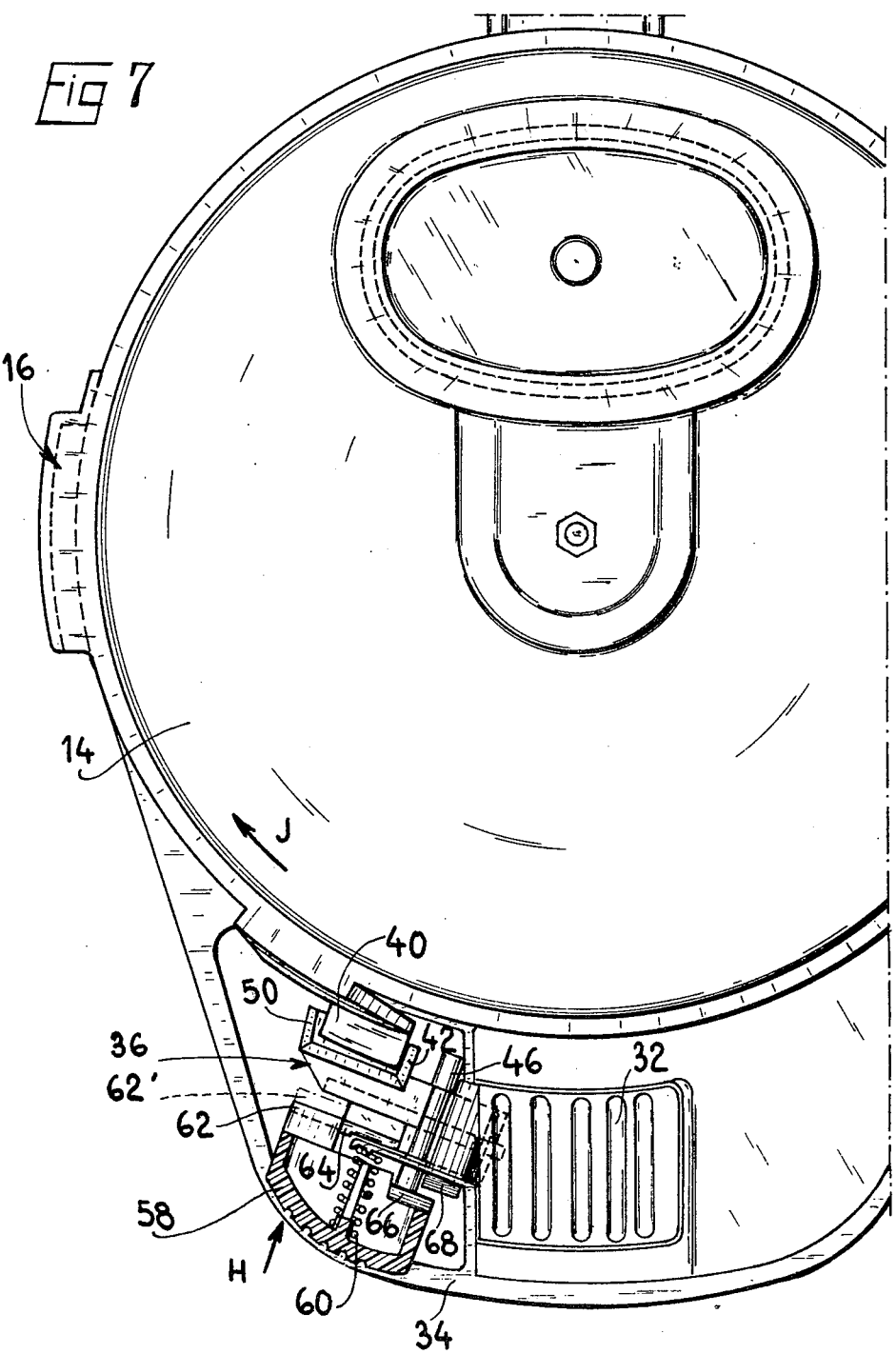

DOMESTIC ELECTRICAL FOOD PROCESSING APPLIANCE

BACKGROUND OF THE INVENTION

The present invention relates to domestic electrical food processing appliances comprising a base supporting a work bowl, and a detachable cover which is brought into the closed position on the bowl by a rotary fixing device, e.g. of the bayonet type. A motor unit is arranged in the base and drives an output shaft which extends within the bowl and carries a work tool.

The motor unit is controlled by a switch which is actuated by means of a push-button which is operated by the user and which is mounted in a boss of the base for movement between a rest position and an operating position in which it actuates the switch.

It is an object of the invention to provide a food processing appliance in which the switch cannot be actuated unless the cover is correctly fixed on the bowl.

SUMMARY OF THE INVENTION

According to the invention there is provided an electrical food processing appliance comprising a base, a work bowl supported on the base, a detachable cover for the work bowl, engaging means arranged upon relative rotary movement between the cover and the bowl to hold the cover in a closed position on the bowl, a motor unit mounted in said base, said motor unit having an output shaft extending within said work bowl, a work tool arranged within said bowl and carried by said output shaft, a switch for controlling said motor unit, and a push-button for actuating said switch, wherein said base has a boss adjacent to said bowl and said push-button is mounted in said boss for movement between a rest position and an operating position in which it actuates said switch, the appliance further comprising a safety bolt mounted in said boss for movement between a locked position in which it maintains said push-button in its rest position and an operative position in which it permits movement of the push-button to its operating position, return means urging said safety bolt into its locked position, and an arm carried by said cover and arranged to engage in a slot in said boss to move said safety bolt into its operative position against the action of said return means when the cover is moved into its closed position on the bowl.

Thus, if the cover is not in its closed position on the bowl, the push-button is held in its rest position by the safety bolt and the switch cannot be actuated.

BRIEF DESCRIPTION OF THE DRAWINGS

An embodiment of the present invention will hereinafter be described, by way of example, with reference to the accompanying drawings, in which:

FIG. 4 shows, on a larger scale, a boss of the base of the appliance in which a control push-button is fitted, viewed in elevation in the direction of the arrow IV of FIG. 1, and after removing the bowl and the cover;

FIG. 5 is a partial vertical section of the boss showing the push-button in its rest position and the safety bolt in the locked position which it occupies in the absence of the cover;

FIG. 6 is a view similar to FIG. 5 but illustrating in solid lines the bolt in its operative position and the push-button in its rest position, and in dash-dot lines the push-button in its operating position;

FIG. 7 is a plan view of the chopping or mincing machine with the cover in the closed position and showing, after removing a hood carried by the top of the boss, the safety bolt and an auxiliary latch intended particularly for the continuous maintenance of the push-button in its operating position; and FIG. 8 shows, in elevation, this latch when it is in engagement with a catch carried by the push-button.

DESCRIPTION OF A PREFERRED EMBODIMENT

Figure 1:
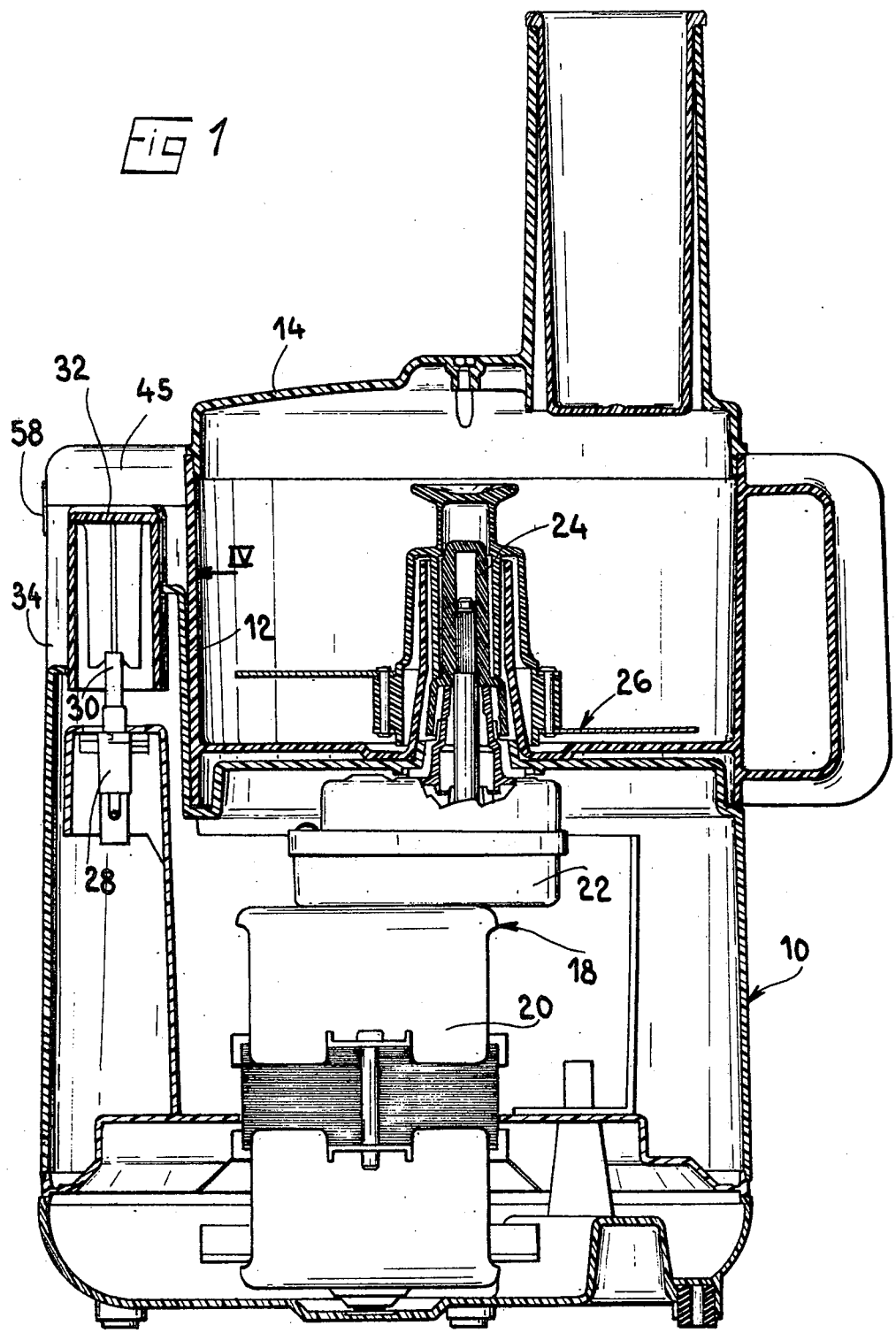
FIG. 1 shows a vertical section of a food processing appliance, e.g. a chopping or mincing machine, according to the present invention.
Figure 2:
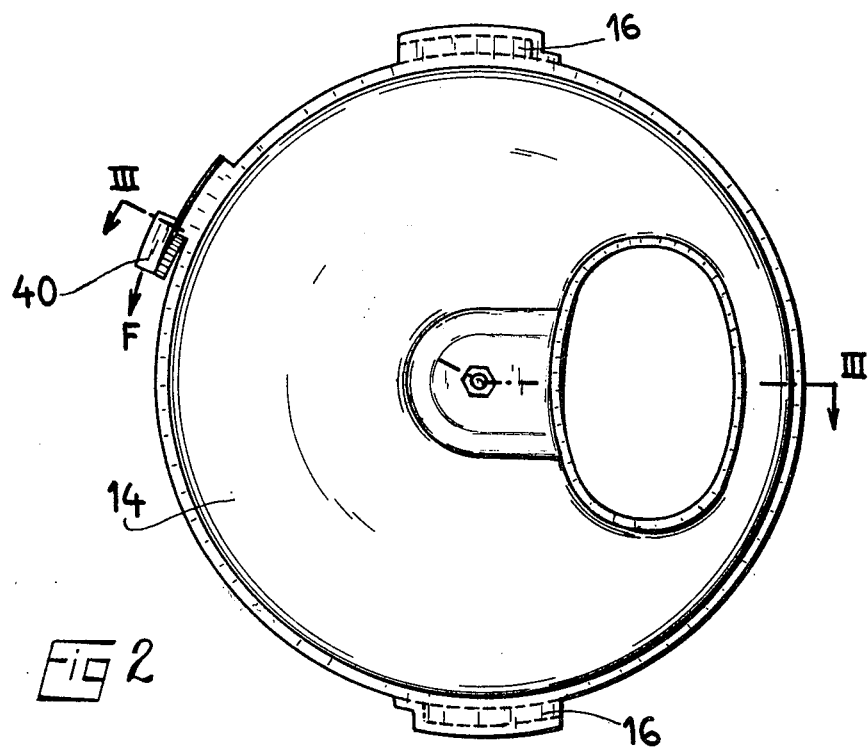
FIG. 2 shows a plan view of a cover for closing the work bowl of the appliance of FIG. 1.
Figure 3:
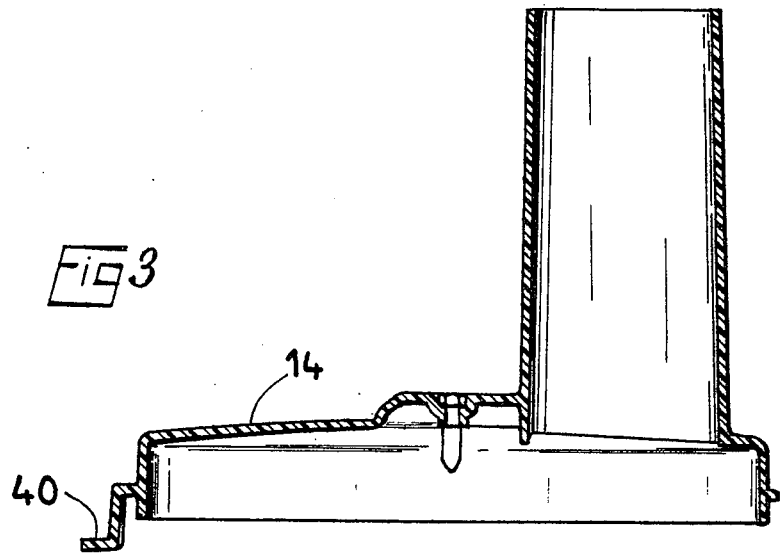
FIG. 3 is a vertical section of the cover taken along the line III—III of FIG. 2.

The chopping or mincing machine illustrated in FIG. 1 comprises a base 10 supporting a work bowl 12 surmounted by a detachable cover 14 which is brought into the closed position on this bowl by a rotary fixing device of the bayonet type as indicated at 16 (FIG. 2). In the base 10 there is arranged a motor unit 18 comprising an electric motor 20 connected to a reduction gear 22 which has an output shaft 24. The output shaft 24 extends within the bowl 12 and carries a work cutter 26.

The motor 20 is controlled by a switch 28 comprising a vertically oriented actuating rod 30 urged upwardly by elastic means (not shown) inside the switch. This rod 30 is actuated by means of a push-button 32 which is operated by the user and which is arranged to slide vertically in a boss 34 of the base 10 adjacent to the bowl 12, between a rest position (solid lines in FIGS. 5 and 6) and an operating position (dash-dot lines 32' in FIG. 6). This push-button 32 is urged elastically towards its top rest position by the rod 30 of the switch.

The appliance is equipped with a safety bolt 36 mounted in the boss 34 to be movable between a locked position (FIG. 5) in which it maintains the push-button 32 in the rest position and towards which it is urged by a spring 38, and an operative position (FIGS. 6 and 7) in which it releases the push-button 32. The safety bolt 36 is brought into its operative position against the action of the spring 38 by a horizontal arm 40 which is carried by the cover 14 and which, when the cover is brought into its closed position (FIGS. 6 and 7), comes into engagement with an operating tab 42 of this bolt through a horizontally oriented slot 44 (FIG. 4) provided in the lateral wall of the boss 34 beneath a hood 45 carried by the top of this boss. In the embodiment illustrated, the arm 40 is integral with the cover 14.

As will be seen in FIGS. 5 to 7, the bolt 36 is mounted to be pivotable about a horizontal axis 46 which extends substantially radially with respect to the cover 14. The bolt 36 has a bifurcated prolongation 48 which projects partially into the slot 44 and which comprises two teeth arranged consecutively along the path travelled by the arm 40 of the cover 14 during the closing movement of the cover 14 on the bowl (arrow G in FIG. 5). The front tooth of the fork 48 forms the operating tab 42 of the bolt, whereas the rear tooth constitutes a capture lug 50 for the arm 40. When the bolt 36 is in its operative position (FIG. 6), this lug 50 projects into the slot 44 behind the rear edge of the arm 40, thus coming into engagement with this arm and preventing it from leaving the slot 44, i.e., preventing the cover from being opened.

The bolt 36 is shaped to present a shoulder 52 which, in the locked position (FIG. 5), is positioned beneath a downwardly extending finger 54 of the push-button 32 and thus maintains this push-button in its top rest position. The bolt 36 also has a groove 56 adjacent to the shoulder 52, and, in the operative position (FIG. 6) of the bolt 36, the groove 56 is positioned beneath the finger 54 and receives this finger when the push-button 32 is moved into its bottom operating position (dash-dot lines in FIG. 6). Thus, when the push-button 32 is depressed to actuate the switch, the finger 54 comes automatically into engagement with the bolt 36 to hold it in its operative position.

The appliance is also equipped with an auxiliary latch 58 (FIGS. 7 and 8) arranged to slide horizontally in the boss 34 between an extended position (solid lines in FIG. 7) in which it maintains the bolt 36 in its operative position and towards which it is urged by a spring 60, and a withdrawn position to which it can be moved against the action of the spring 60 in the direction of arrow H in FIG. 7. In its withdrawn position, the latch 58 releases the bolt 36 and permits it to move into its locked position provided that this bolt is not locked by the finger 54, i.e., that the push-button 32 is in its rest position. The latch 58 maintains the bolt 36 by means of a downwardly oriented vertical stop 62 (FIGS. 7 and 8) which, in the extended position of the latch comes into engagement with a fin 64 of the bolt arranged in a vertical plane perpendicular to the pivotal axis 46, and which, in the withdrawn position of the latch, assumes the position 62' (shown by dash lines in FIG. 7) in which the fin 64 is released. The latch 58 also has a downwardly directed prolongation 66 (see especially FIG. 8) adapted to hook on a catch 68 carried by the push-button 32 both when this push-button is in its bottom operating position and when the latch is in its withdrawn position.

When the cover of the appliance is removed, the latch 58 is in its withdrawn position (position 62' in FIG. 7), the bolt 36 is in its locked position (FIG. 5) and the push-button 32 is consequently maintained in its top rest position.

The cover 14 is closed by rotating it in the direction of arrow F in FIG. 2 for the purpose of using the appliance. As the cover 14 is closed the arm 40 carried thereby is moved in the slot 44 (in the direction of arrow G in FIGS. 4 and 5), comes into contact with the tab 42, and thus pivots the bolt 36 into its operative position (FIGS. 6 and 7) against the action of the spring 38. At the end of this movement, the fin 64 of the bolt 36 releases the stop 62 of the latch 58, which by the action of the spring 60 moves into its extended position in which the stop 62 is then in engagement with the fin 64 to lock the bolt 36 in its operative position. At this moment the arm 40 is captive in the slot 44 by the lug 50, thus prohibiting the direct opening of the cover.

Then, in order to make the appliance operate, the user presses the push-button 32 (dash-dot lines 32' in FIG. 6), which causes, on the one hand, the lowering of the rod 30 and hence the "making" of the switch 28, and, on the other hand, the engagement of the finger 54 into the housing 56.

If the user then releases the push-button, the latter rises automatically towards its rest position by the return effect exerted by the rod 30 of the switch 28.

To enable the cover 14 to be opened after use, the user must exert a pressure upon the latch 58 (arrow H in FIG. 7) in order to bring the stop 62 into the withdrawn position 62' and thus to release the bolt 36, and must simultaneously rotate the cover in the direction of the arrow J. The bolt returns into its locked position of FIG. 5 during this opening movement of the cover.

If the user wishes to maintain the appliance in operation without continuously exerting pressure upon the push-button 32, he can, when this push-button has first of all been lowered, move the latch 58 into the withdrawn position and maintain it there whilst he releases the push-button. The push-button then rises slightly until its catch 68 comes into engagement with the prolongation 66 of the latch (FIG. 8). When the user releases the latch, the latter remains hooked in its withdrawn position, the push-button remains hooked in its bottom operating position, and the bolt remains in its operative position since it is maintained there by the effect of the locking finger 54.

In order to break the switch subsequently, it is sufficient to give the push-button a brief downward impulse. The latch then returns immediately into its extended position and the push-button then rises into its rest position. The bolt 36 is still maintained in its operative position by the stop 62 until the user presses upon the latch for the purpose of opening the cover as described above.

I claim:

1. Electrical food processing appliance comprising a base supporting a work bowl and having a boss adjacent to said bowl, a detachable cover for the work bowl, engaging means arranged upon relatively rotary movement between the cover and the bowl to hold the cover in a closed position on the bowl, a motor unit mounted in said base, said motor unit having an output shaft extending within said work bowl, a work tool arranged within said bowl and carried by said output shaft, a switch for controlling said motor unit, a push-button for actuating said switch mounted in said boss for movement between a rest position and an operating position in which it actuates said switch, a safety bolt mounted in said boss for movement between a locked position in which it maintains said push-button in its rest position and an operative position in which it permits movement of the push-button to its operating position, return means urging said safety bolt into its locked position, an arm carried by said cover arranged to engage in a slot in said boss and to move said safety bolt into its operative position against the urging of said return means when the cover is moved into its closed position on the bowl, and locking means arranged to automatically lock the safety bolt in its operative position, wherein the safety bolt is pivotably mounted in said boss and has a bifurcated portion which projects partially into the slot of the boss, said bifurcated portion comprising first and second teeth arranged consecutively along a path travelled by the arm of the cover in said slot during the closing movement of the cover, the first tooth forming an operating tab of the bolt against which the arm acts to move the bolt into its operative position, and the second tooth forming a capture lug for the arm, which, when the bolt is in its said operative position, engages said arm on the cover when the cover is moved in a direction to remove the cover from the bowl.

2. Food processing appliance according to claim 1, wherein said arm of the cover extends substantially horizontally and the slot of the boss extends in a lateral wall of said boss, and the safety bolt is mounted to be pivotable about a horizontal axis which extends substantially radially with respect to the cover, and wherein the push-button is arranged to slide substantially vertically in said boss between its rest position and its operating position.

3. Electrical food processing appliance comprising a base, a work bowl supported on the base, a detachable cover for the work bowl, engaging means arranged upon relative rotary movement between the cover and the bowl to hold the cover in a closed position on the bowl, a motor unit mounted in said base, said motor unit having an output shaft extending within said work bowl, a work tool arranged within said bowl and carried by said output shaft, a switch for controlling said motor unit, and a push-button for actuating said switch, wherein said base has a boss adjacent to said bowl and said push-button is mounted in said boss for movement between a rest position and an operating position in which it actuates said switch, the appliance further comprising a safety bolt mounted in said boss for movement between a locked position in which it maintains said push-button in its rest position and an operative position in which it permits movement of the push-button to its operating position, return means urging said safety bolt into its locked position, an arm carried by said cover arranged to engage in a slot in said boss and to move said safety bolt into its operative position against the urging of said return means when the cover is moved into its closed position on the bowl, and locking means arranged to automatically lock the safety bolt in its operative position, said bolt having a capture lug which, when the bolt is in its said operative position, re-engages said arm on the cover when the cover is moved in a direction to remove the cover from the bowl, said locking means for the safety bolt comprising a finger carried by the push-button and arranged to contact said bolt when the push-button is moved into its operating position.

4. Food processing appliance according to claim 3, wherein the safety bolt has a shoulder which, in the locked position of the bolt, is arranged beneath said finger whereby the push-button is maintained in its rest position, and wherein the safety bolt includes a groove adjacent to said shoulder, said groove, in the operative position of the bolt, being arranged beneath said finger such that the finger is received in the groove when the push-button is moved into its operating position.

5. Electrical food processing appliance comprising a base, a work bowl supported on the base, a detachable cover for the work bowl, engaging means arranged upon relative rotary movement between the cover and the bowl to hold the cover in a closed position on the bowl, a motor unit mounted in said base, said motor unit having an output shaft extending within said work bowl, a work tool arranged within said bowl and carried by said output shaft, a switch for controlling said motor unit, and a push-button for actuating said switch, wherein said base has a boss adjacent to said bowl and said push-button is mounted in said boss for movement between a rest position and an operating position in which it actuates said switch, the appliance further comprising a safety bolt mounted in said boss for movement between a locked position in which it maintains said push-button in its rest position and an operative position in which it permits movement of the push-button to its operating position, return means urging said safety bolt into its locked position, an arm carried by said cover arranged to engage in a slot in said boss and to move said safety bolt into its operative position against the urging of said return means when the cover is moved into its closed position on the bowl, locking means arranged to automatically lock the safety bolt in its operative position, said bolt having a capture lug which, when the bolt is in its said operative position, engages said arm on the cover when the cover is moved in a direction to remove the cover from the bowl, said locking means for the safety bolt comprising a latch mounted in the boss for movement between an extended position in which it maintains the bolt in its operative position and a withdrawn position in which it permits movement of the bolt into its locked position, and return means urging said latch into its extended position.

6. Food processing appliance according to claim 5, wherein said latch is mounted in said boss to slide substantially horizontally, and said latch has a vertical stop which, in the extended position of the latch, comes into contact with a fin carried by the bolt and arranged in a vertical plane.

7. Food processing appliance according to claim 6, further comprising return means urging said push-button towards its rest position, and wherein the latch, when in its withdrawn position, is arranged to maintain the push-button in its operating position against the urging of said return means.

8. Food processing appliance according to claim 7, wherein the latch carries an extended portion which, in the withdrawn position thereof, is arranged to engage a catch carried by the push-button whereby the push-button is maintained in its operating position.

* * * * *